United States Patent [19]

Ugai et al.

[11] Patent Number: 5,259,248
[45] Date of Patent: Nov. 9, 1993

[54] INTEGRATED MULTISENSOR AND STATIC AND DIFFERENTIAL PRESSURE TRANSMITTER AND PLANT SYSTEM USING THE INTEGRATED MULTISENSOR

[75] Inventors: Seiichi Ugai; Satoshi Shimada, both of Hitachi; Tomoyuki Tobita; Akira Sase, both of Katsuta, all of Japan

[73] Assignee: Hitachi Ltd., Tokyo, Japan

[21] Appl. No.: 672,113

[22] Filed: Mar. 19, 1991

[30] Foreign Application Priority Data

Mar. 19, 1990 [JP] Japan .................................. 2-067038

[51] Int. Cl.⁵ .......................... G01L 9/06; G01L 13/02
[52] U.S. Cl. ............................................ 73/721; 73/708; 73/727; 338/4; 374/143
[58] Field of Search ................. 73/714, 721, 720, 727, 73/726, 708, 706; 338/4, 3; 374/143

[56] References Cited

U.S. PATENT DOCUMENTS

| | | | |
|---|---|---|---|
| 4,222,277 | 9/1980 | Kurtz et al. | 73/721 |
| 4,528,855 | 7/1985 | Singh | 73/721 |
| 4,530,244 | 7/1985 | Starr | 73/721 |
| 4,986,127 | 1/1991 | Shimada et al. | 73/721 |

FOREIGN PATENT DOCUMENTS

| | | |
|---|---|---|
| 0189492 | 1/1985 | European Pat. Off. . |
| 3345988 | 6/1984 | Fed. Rep. of Germany . |
| 3725311 | 2/1988 | Fed. Rep. of Germany . |
| 3928542 | 3/1990 | Fed. Rep. of Germany . |

OTHER PUBLICATIONS

Elektronik 16/Jul. 8, 1987, pp. 74-77.

*Primary Examiner*—Donald O. Woodiel
*Attorney, Agent, or Firm*—Antonelli, Terry, Stout & Kraus

[57] ABSTRACT

In an integrated multisensor used in a differential and static pressure transmitter, a pair of static pressure gages are formed on a static pressure detecting diaphragm and another pair of static pressure gages are formed at positions on a fixed portion which are near to the center of a differential pressure detecting diaphragm. The second term generated by a differential pressure appearing in a static pressure sensor is a function of a distance. Therefore, equal influence is exerted on each static pressure gage. Accordingly, by constructing a static pressure sensor so as to form a bridge circuit, a static pressure value free of the influence of a differential pressure can be detected, thereby making it possible to determine an accurate differential and static pressure.

22 Claims, 10 Drawing Sheets

$\Delta Rs/Rs$ : RATE OF CHANGE IN RESISTANCE OF STATIC PRESSURE GAGE

INTEGRATED MULTISENSOR AND STATIC AND DIFFERENTIAL PRESSURE TRANSMITTER AND PLANT SYSTEM USING THE INTEGRATED MULTISENSOR

BACKGROUND OF THE INVENTION

The present invention relates to an integrated multisensor (a composite sensor) which is used in a pressure and differential pressure transmitter for detecting a flow (or the quantity of flow) or a pressure in a chemical plant or the like and in which the characteristic of a static pressure sensor upon differential pressure load is improved, and also relates to an intelligent differential pressure transmitter and a plant system which use such an integrated multisensor.

In the conventional sensor used in a sensing part of an intelligent differential pressure transmitter, differential pressure, static pressure and temperature sensors are provided on one substrate and the three kinds of sensors make compensation for each other to measure a differential pressure with a high precision. For example, U.S. Pat. No. 4,530,244 has proposed a structure in which a sensor for detecting the influences of temperature and static pressure is provided on a thick thickness portion and a sensor for detecting a differential pressure is provided on a diaphragm. Also, JP-B-62-22272 has disclosed the combination of a sensor for removing the influence of a static pressure and a differential pressure sensor but the influence of a differential pressure acting on a static pressure sensor is not discussed. Namely, it is known that in the conventional integrated multisensor, the respective outputs of sensors cannot provide independent variations and have influence on each other.

The conventional differential pressure transmitter determines a pressure difference or differential pressure $\Delta P$ produced when a liquid pressure-transmitted by a pressure pump passes through an orifice provided in a pipeline of a chemical plant or the like, thereby detecting the quantity of flow Q according to the following equation:

$$Q = k \sqrt{\Delta P}$$

where k is a constant determined by Reynold's number and diameter of the orifice. As mentioned above, since the output of a differential pressure sensor is influenced by a static pressure $P_s$ and a temperature T. Therefore, in the measurement of the quantity of flow, the static pressure $P_s$ exerted on the pipeline and a change of the ambient temperature turn out disturbance to the integrated multisensor and hence the influences thereof should be removed to the utmost.

In a differential pressure transmitter using the conventional integrated multisensor, a static pressure, a temperature and a differential pressure are detected by indivisual sensors. As mentioned above, since each sensor detects a corresponding variation which includes the other variations in an added form. Therefore, a complicated procedure for correction is carried out to remove the influences of the other variations.

Also, in the case where a differential pressure detecting diaphragm and a static pressure detecting diaphragm are provided in one semiconductor substrate, there is a problem that an interval between both the diaphragms becomes narrow (during an etching process), thereby decreasing the adhesive length to a fixing base which supports the semiconductor substrate.

Further, in the case where a differential pressure detecting diaphragm with a central rigid plate is formed by use of anisotropic etching, there is a problem that a quadrangular central rigid body surrounded by <111> faces is most easily formed with the result that a stress is concentrated at each corner portion, thereby decreasing the pressure durability (tight ability).

Furthermore, if a differential pressure detecting diaphragm and a static pressure detecting diaphragm have the same plate thickness, there is a problem that when the size of a semiconductor substrate is to be made small, the static pressure detecting diaphragm becomes too small thereby making it difficult to arrange a gage resistor(s) on the static pressure detecting diaphragm.

SUMMARY OF THE INVENTION

An object of the present invention is to provide an integrated multisensor in which a static pressure sensor is constructed so that the influence of a differential pressure acting on the static pressure sensor upon application of the differential pressure thereto is removed, and to provide an intelligent differential pressure transmitter which uses such an integrated multisensor to permit the detection of a differential pressure of satisfactory precision through a simple operation.

Another object of the present invention is to provide an integrated multisensor manufacturing method which include working a differential pressure detecting diaphragm to make a plate thickness thereof thinner than that of a static pressure detecting diaphragm, contriving the procedure of etching or limiting the impurity concentration of a silicon substrate, in order to improve the precision of detection of an integrated multisensor which forms an intelligent differential pressure transmitter.

A further object of the present invention is to provide a sensor construction in which a constant adhesive strength is kept.

A still further object of the present invention is to provide a central rigid plate configuration which has a high pressure durability.

A furthermore object of the present invention is to provide an industrial plant system which measures the quantity of flow by use of a high-precision intelligent differential pressure transmitter.

According to one aspect of the present invention, at least one gage sensor formed in static pressure sensor diaphragm are provided separately from a differential pressure sensor diaphragm. The static pressure sensor detects a static pressure through an operation processing using the resistance change of each gage resistors. In order to remove a non-linear influence when the differential pressure acts on the static pressure sensor, gage resistors for the static pressure sensor are disposed at positions where a stress caused by a differential pressure load is exerted on each gage resistor with a substantially equal magnitude. By using an integrated multisensor having the above construction, a data processing procedure can be simplified and a signal processing can be sufficed by performing an adding/subtracting operation on the respective outputs of sensors as they are.

According to another aspect of the present invention, in the case where a silicon wafer having a {001} plane is subjected to an anisotropic etching process using an aqueous solution of KOH or the like, a static pressure detecting diaphragm is disposed in proximity to a <110> oriented side where the etching makes almost no progress. Thereby, a desired diaphragm interval is ensured and a high pressure durability is ensured. Also, in the case where the same anisotropic etching process as mentioned above is conducted, a static pressure detecting diaphragm (or a static pressure sensor) may be disposed in a direction of <100> relative to a differential pressure detecting diaphragm in order to reduce the influence of a differential pressure acting on the static pressure sensor.

According to still another aspect of the present invention, a central rigid plate is configured into a polygon which is angled not less than a hexagon (that is, an n-gon which satisfies $n \geq 6$).

According to a further aspect of the present invention, the surface of a differential pressure detecting diaphragm is etched so as to work the differential pressure detecting diaphragm so that a plate thickness thereof becomes thinner than that of a static pressure detecting diaphragm, or a differential pressure detecting diaphragm and a static pressure detecting diaphragm are equally worked. Alternatively, the impurity concentration of a silicon substrate is selected to be not higher than $2 \times 10^{18}/cm^3$.

In an integrated multisensor having a differential pressure sensor and a static pressure sensor formed on the same substrate, when a differential pressure is applied, a stress is applied to the static pressure sensor under the influence of the differential pressure. In the case where the static pressure sensor is formed near to the differential pressure sensor, the stress applied to the static pressure sensor is dependent on stretching stress and related to a distance from the differential pressure sensor. If a plurality of static pressure sensors are arranged without taking the above relation into consideration, the static pressure sensors will generate outputs influenced by differential pressures which have different magnitudes. Therefore, in the present invention, a static pressure is measured with a construction in which static sensors are arranged so that stretching stresses produced by differential pressures become equal to each other and the static pressure sensors are bridged so that the influences of the differential pressures acting on the static pressure sensors are cancelled from each other. However, with the construction is which the influences of the differential pressures are cancelled, it follows that static pressures are similarly cancelled from each other and no output voltage is obtained. Therefore, two kinds of gage resistors including a gage resistor disposed on a fixed portion so as to detect a static pressure by use of a difference in elastic modulus of a fixing base and a gage resistor disposed on a static pressure detecting diaphragm so as to detect an absolute pressure are provided so that only a static pressure with the influence of differential pressure being cancelled is detected by use of the fact that the gage resistor disposed on the diaphragm has a larger resistance change than the gage resistor disposed on the fixed portion in the case where the static pressure acts.

DESCRIPTION OF THE PREFERRED EMBODIMENTS

Now, an embodiment of the present invention will be explained by virtue of FIGS. 1 to 5.

Figure 1:
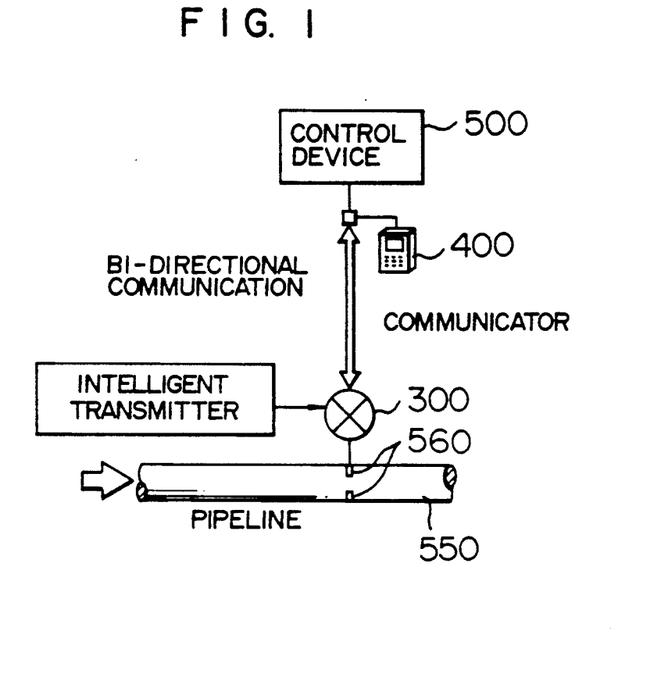
FIG. 1 is a systematic diagram of a plant system in which an intelligent transmitter according to the present invention is used.

FIG. 1 shows an example of a pipeline system in which a flow measuring apparatus using a differential pressure transmitter of the present invention is incorporated.

A differential pressure $\Delta P$ generated between opposite ends of an orifice 560 provided in the course of a pipeline 550 of a chemical plant or the like is measured by a differential pressure transmitter 300 of the present invention to determine the quantity of flow in the pipeline and the determined quantity of flow is transmitted to a control device 500. In the control device 500, a pump to apply a pressure to a fluid in the pipeline is controlled in accordance with the measured quantity of flow so that a proper quantity of flow is sent. A communicator 400 is an input/output device by which a person monitors the conditions of the system to give instructions for the alteration of a quantity to be controlled, and so on.

In the present system, if a differential pressure can be measured accurately, the precision of detection of the quantity of flow can be improved and the plant can be operated more effectively.

Figure 2:
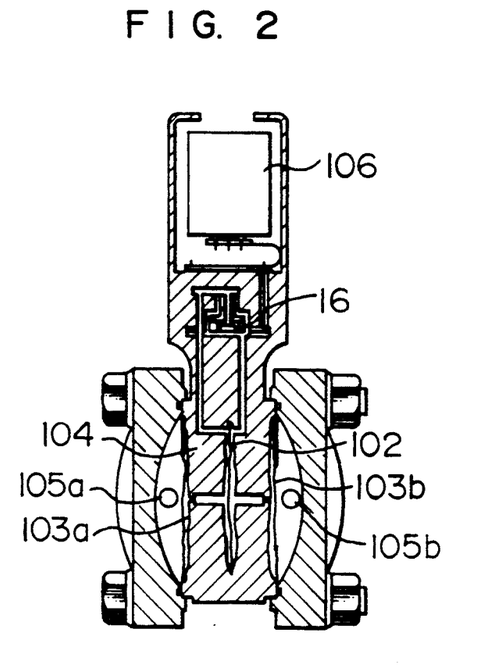
FIG. 2 is a view showing the construction of the whole of the intelligent transmitter.

The differential pressure transmitter 300 of the present invention has a construction as shown in FIG. 2. In the figure, reference numeral 16 denotes an integrated multisensor which is constructed by a differential pressure sensor, a static pressure sensor, a temperature sensor, and so on. Numeral 102 denotes a center diaphragm which isolates a high-pressure side and a low-pressure side from each other, numerals 103a and 103b denotes seal diaphragms each of which isolates the external environment and a pressure transmission medium (such as a silicone oil) in the transmitter from each other and is applied with an external pressure, numeral 104 a transmitter body which may be made of SUS or the like, numerals 105a and 105b pressure introduction ports and numeral 106 a signal processing circuit which amplifies sensor outputs and performs an operation for data processing.

Thus, the differential pressure transmitter includes a pressure receiving port having two liquid chambers. A static pressure $P_s$ applied from the high-pressure or low-pressure side is higher than 100 atmospheres. Therefore, even in the case where pressures applied from the high-pressure side and the low-pressure side and equal to each other, a minute differential pressure is generated due to a difference in the quantity of sealing liquid between the two liquid chambers or the distortion of the pressure receiving part, thereby varying the output of the differential pressure sensor. This variation is an error called static-pressure influence and a sensor for detecting independently a static pressure is necessary in order to remove the static-pressure influence. However, in the conventional static pressure sensor, the static pressure sensor itself is influenced by the influence of a differential pressure and it is necessary to make compensation for the influence of differential pressure. Further, since a static pressure sensor or a differential pressure sensor is easily influenced by a change in temperature, it is necessary to make compensation for a variation caused from the temperature change. Therefore, the present invention employs a construction, as shown in FIGS. 3A to 3E, which realizes an integrated multisensor capable of detecting an accurate static pressure while removing the influence of a differential pressure applied to a static pressure and can determine the differential pressure through a simple processing, as will be mentioned in later.

Figure 3A:
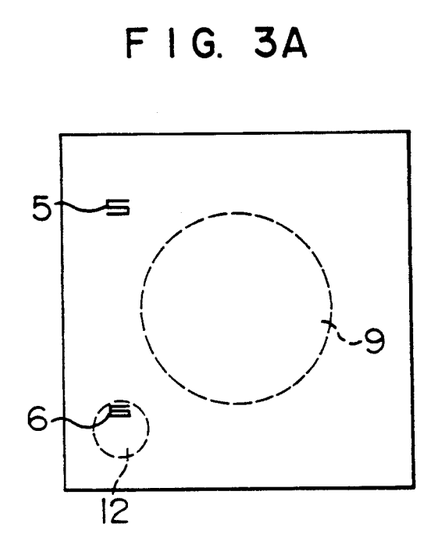
FIGS. 3A to 3E are views for explaining the principle of a static pressure detecting method in a integrated multisensor of the present invention.
Figure 3B:
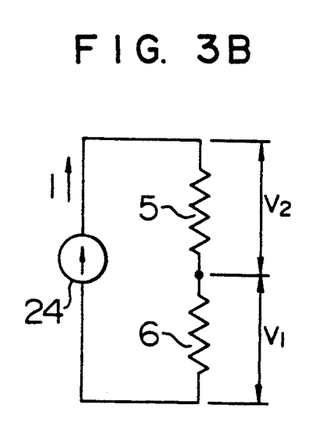
Figure 3C:
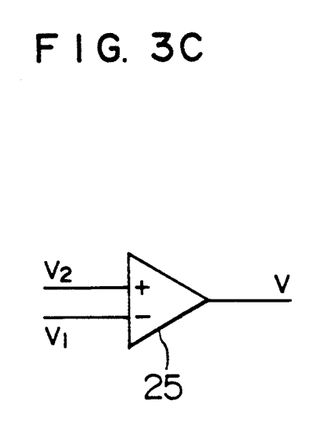
Figure 3D:
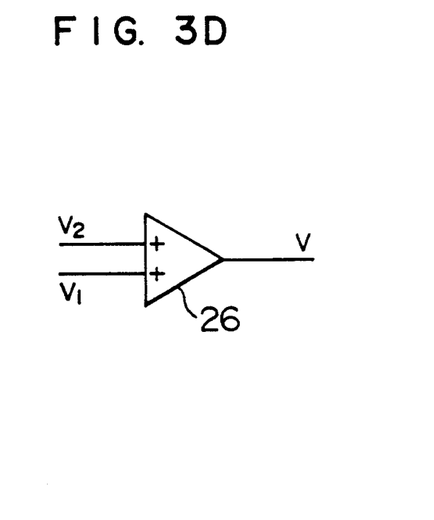
Figure 3E:
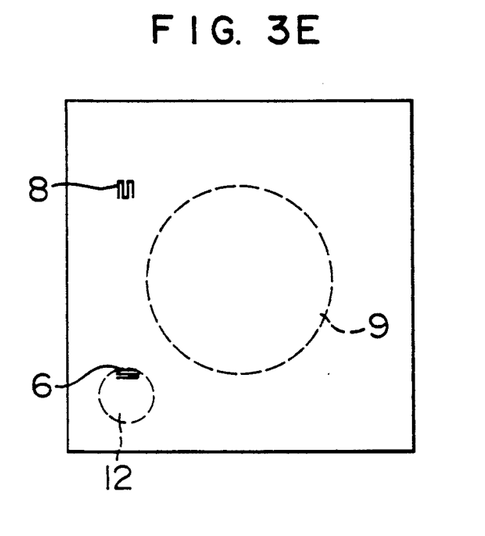

In FIG. 3A, a gage resistor 6 is a static pressure detecting gage resistor formed on a static pressure detecting diaphragm 12 and a gage resistor 5 is a static pressure detecting gage resistor formed on a fixing base and parallel to the gage resistor 6. In FIG. 3E, a gage resistor 8 is a static pressure detecting gage resistor which is formed on the fixed portion similarly to the gage resistor 5 but is formed perpendicularly to the gage resistor 6. Each of the gage resistors 5 and 8 is disposed at a distance nearer to a differential pressure detecting diaphragm 9 than the gage resistor 6.

Figure 15:
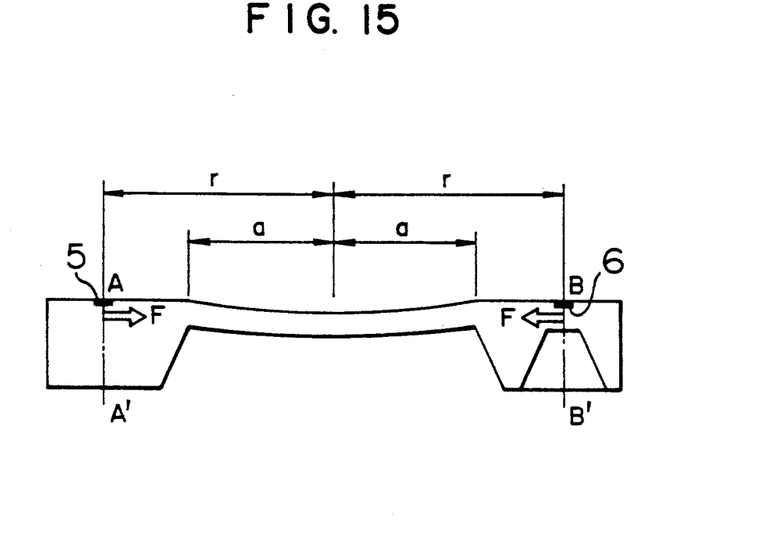
FIG. 15 is a view for explaining the influence of a differential pressure acting on a static pressure sensor of the present invention.

If the gage resistors 5 and 6 are equally distanced from the differential pressure diaphragm, as shown in FIG. 15, a force F associated with a differential pressure load is received with a cross section A—A' at the position of the gage resistor 5 and with a cross section B—B' smaller than the cross section A—A' at the position of the gage resistor 6. Therefore, the gage resistor 6 on the static pressure detecting diaphragm receives a large stress as compared with the gage resistor 5 on the fixed portion.

Figure 4:
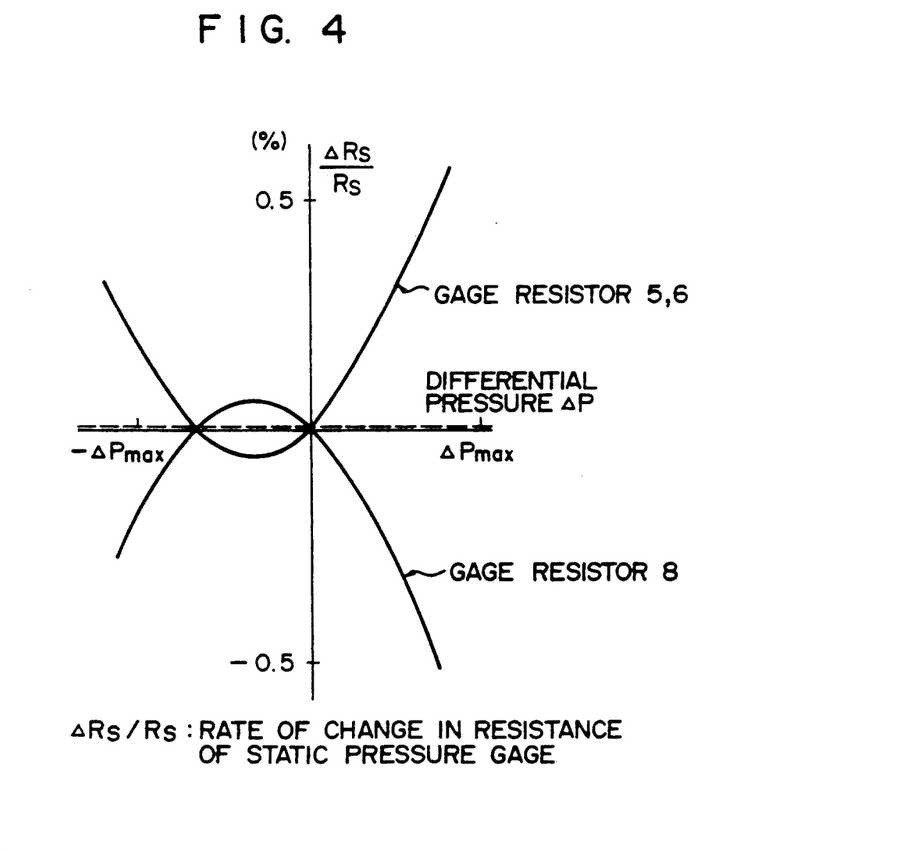
FIG. 4 is a graph showing the rates of change in resistance of static pressure detecting gages when a differential pressure changes.
Figure 16:
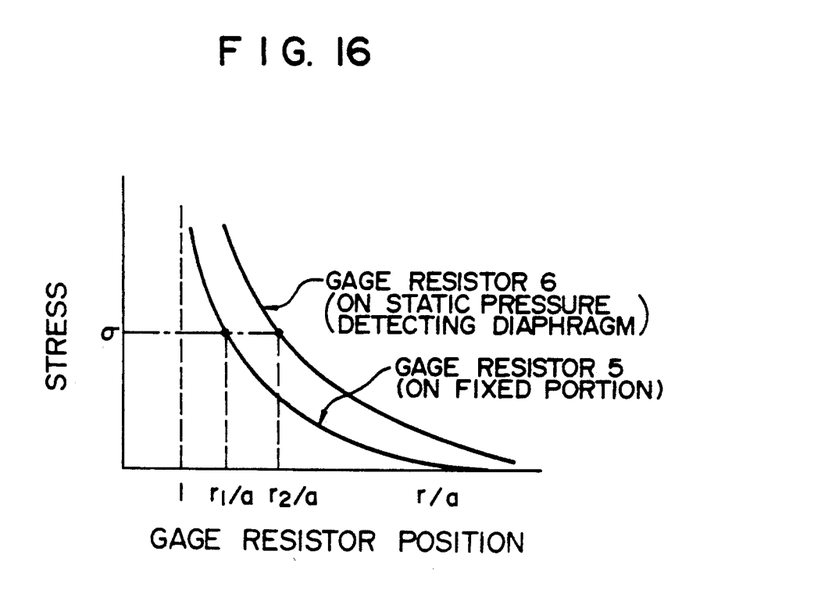
FIG. 16 is a graph showing a relationship between the static pressure gage position and the stress.

However, a stress acting on a gage resistor greatly depends upon a distance from the differential pressure diaphragm, as shown in FIG. 16. If the gage resistor 5 on the fixed portion is made nearer to the differential pressure detecting diaphragm than the gage resistor 6 on the static pressure detecting diaphragm by use of the relationship shown in FIG. 16 so that the gage resistors 5 and 6 are disposed at positions which are respectively distanced by $r_1$ and $r_2$ and at which the same stress is exerted, the rate of change in resistance as shown in FIG. 4 is exhibited. In FIG. 4, the resistances of the gage resistors 5 and 6 exhibit the same change with the same sign and the resistance of the gage resistor 7, 8 exhibits a change with a sign reverse to the gage resistor 6. Accordingly, the influence of the differential pressure is cancelled by connecting the gage resistors 5 and 6 in series with a constant current source 24, as shown in FIG. 3B, to establish voltages $V_2$ and $V_1$ across the gage resistors 5 and 6 and using a subtracter 25 as shown in FIG. 3C. On the other hand, in the case where a static pressure is applied, a change in resistance of the gage resistor 5 is remarkably small as compared with that of the gage resistor 6. Therefore, even if the subtraction is made, an output is generated due to a static pressure corresponding to the change in resistance of the gage resistor 5. Also, if the gage resistor 5 in FIG. 3B is replaced by the gage resistor 8 shown in FIG. 3E, $V_1$ and $V_2$ upon application of a differential pressure exhibit changes which are equal in magnitude to each other but reverse in sign to each other. Accordingly, in this case, the influence of the differential pressure can be cancelled by using an adder 26 as shown in FIG. 3D.

The above operation will be mathematically explained. The static pressure sensor is composed of the gage resistors 5 and 6 which are connected as shown in FIG. 3B. When the static pressure sensor is excited by a constant current I, the static pressure sensor provides an output v represented by $$v = I \cdot (R_{50} - R_{60} + \Delta R_5 - \Delta R_6) \quad (1)$$

where $R_{50}$ and $R_{60}$ represent resistance values when a differential pressure $\Delta P$ and a static pressure $P_s$ are both zero and $\Delta R_5$ and $\Delta R_6$ represent variations when the differential pressure and the static pressure are applied. The rates of change are represented by $$\Delta R_5/R_{50} = g(x, P_s) + f(r, \Delta P) \quad (2)$$

$$\Delta R_6/R_{60} = G(x', P_s) + F(r', \Delta P) \quad (3)$$

where r and r' represent distances from the center of the differential pressure diaphragm 9 to the centers of the static pressure gages 5 and 6 and x and x' represent distances to the gages 5 and 6 from center of a static pressure sensor diaphragm. The reason why the first term $g(x, P_s)$ for $R_5$ in equation (2) and the first term $G(x', P_s)$ for $R_6$ in equation (3) are different, is because $R_5$ disposed on the fixed portion is a static pressure detecting gage resistor which utilizes a difference in elastic modulus and $R_6$ formed on the static pressure detecting diaphragm is a static pressure detecting gage resistor which detects an absolute pressure. There is a relation of $g(x, P_s) << G(x', P_s)$.

If the gage resistors 5 and 6 are formed so as to satisfy $R_{50} = R_{60} (=R_o)$ in equations (2) and (3) and are arranged at positions of $r=r_1$ and $r'=r_2$, as shown in FIGS. 16 and 4, the second terms in equations (2) and (3) depending upon the differential pressure $\Delta P$ are cancelled from each other since they are equal to each other. Accordingly, equation (1) can be written as follows:

$$v = l \cdot \{g(x, P_s) - G(x', P_s)\} \quad (4)$$

$$= l \cdot \left( \left. \frac{\partial g(x, P_s)}{\partial P_s} \right|_{P_s=0} - \left. \frac{\partial G(x', P_s)}{\partial P_s} \right|_{P_s=0} \right) \cdot P_s \quad (5)$$

As mentioned before, $\partial g/\partial P_s|_{P_s=0}$ and $\partial G/\partial P_s|_{P_s=0}$ for static pressure $P_s$ are greatly different between the case the gage resistor is disposed on the static pressure detecting diaphragm and the case where it is disposed on the fixed portion. As mentioned above the second terms in equation (2), (3) which is differential-pressure influence terms $f(r, \Delta P)$ and $F(r', \Delta P)$ are removed leaving static-pressure influence terms, as shown by equation (5). As a result, it is possible to construct a static pressure sensor which is free of the influence of differential pressure.

Next, the detailed construction of the above-mentioned integrated multisensor will be explained by virtue of FIGS. 5A to 5C.

Figure 5A:
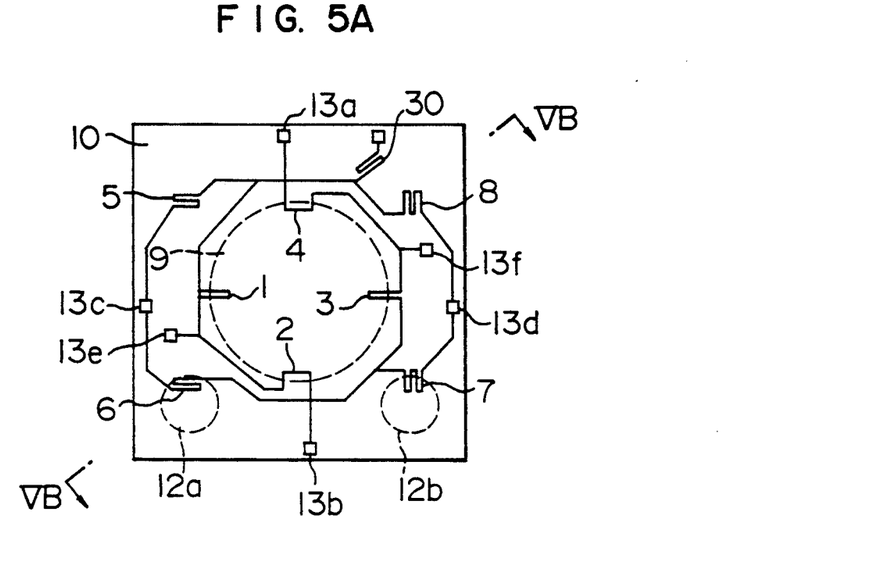
FIGS. 5A to 5C are views showing the construction of the whole of an embodiment of an integrated multisensor according to the present invention.
Figure 5B:
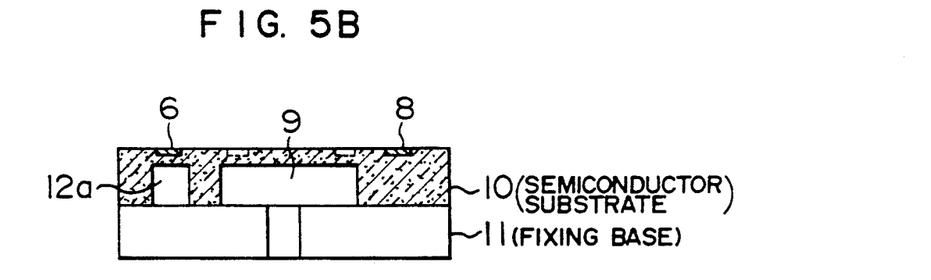

FIG. 5A is a plan view of the integrated multi-sensor and FIG. 5B is a cross section taken along line A—A' in FIG. 5A. Also, FIG. 5C shows an example of connection when the above-mentioned static pressure sensor and a differential pressure sensor are connected. In FIG. 5A, reference numerals 1 to 4 denote differential pressure detecting gage resistors formed by doping a semiconductor substrate 10 of monocrystalline silicon with an impurity through ion implantation or thermal diffusion. These gage resistors 1 to 4 are formed in the area of a diaphragm 9 which is worked by alkaline etching or dry etching. Numerals 5 to 8 denote static pressure detecting gage resistors. The gage resistor 6 is formed on a static pressure detecting diaphragm 12a and the gage resistor 7 is formed on a static pressure detecting diaphragm 12b provided separately from the diaphragm 12a. When a differential pressure is applied, bending and stretching stresses are generated at the gage resistors 6 and 7. The gage resistors 5 and 8 are formed at positions where stretching stresses having magnitudes equal to the stresses generated at the gage resistors 6 and 7 are generated. A gage resistor 30 is a temperature gage which is disposed on a fixed portion. Further, the temperature gage 30 is disposed in a direction of <100> which is insensible to any stress. Numerals 13a to 13f denote electrode pads. After connection has been made as shown in FIG. 5C, a constant voltage is applied between the electrode pads 13a and 13b so that a differential pressure output is obtained between the electrode pads 13c and 13d and a static pressure is obtained between the electrode pads 13e and 13f. Reference numeral 11 shown in FIG. 5B denotes a fixing base for supporting the semiconductor substrate 10. The fixing base 11 is made of boron-silicated glass. In the case where a differential pressure is applied to this integrated multisensor, the resistances of the gage resistors 7 and 8 exhibit changes equal in value but reverse in sign to the resistance values of the gage resistors 5 and 6 if the resistance values of the gage resistors 5 and 6 are increased as shown in FIG. 4. Accordingly, if a bridge circuit as shown in FIG. 5C is constructed, it is possible to obtain a static pressure sensor output which includes no variation induced by the differential pressure. Also, in the case of the conventional static pressure sensor utilizing a change in elastic modulus, a change in resistance value of the sensor upon application of a static pressure of about 100 atmospheres is small as about 0.5%. In the present embodiment, however, since the absolute pressure type of static pressure sensor is involved, it is possible to raise the change in resistance value of the sensor up to 5% which is about ten times as large as that of the conventional static pressure sensor. Namely, the sensitivity of the static pressure sensor of the present embodiment to static pressure can be improved to about ten times as compared with the conventional static pressure sensor utilizing a change in elastic modulus.

According to the above construction, since it is possible to make the diameter of the static pressure detecting diaphragm small and the influence of a differential pressure acting on the static sensor can be removed to permit accurate measurement of the static pressure sensor and the differential pressure, a differential pressure detector can be realized which has a small size and a high precision.

Figure 6:
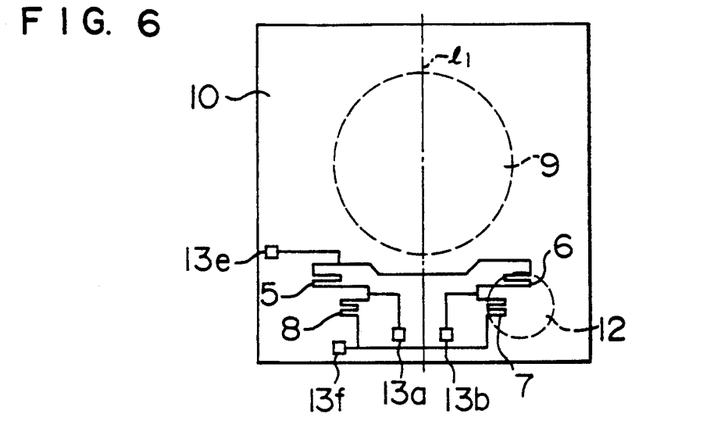
FIG. 6 is a view showing another embodiment of an integrated multisensor according to the present invention.

FIG. 6 shows another embodiment of an integrated multisensor according to the present invention.

In the present embodiment, only one static pressure sensor diaphragm 12 is provided, static pressure detecting gage resistors 6 and 7 are provided in the same direction in the static pressure detecting diaphragm 12, and gage resistors 5 and 8 are provided on a fixed portion so that they are positioned nearer to the center line $l_1$ of a differential pressure detecting diaphragm 9 than the gage resistors 6 and 7. A static pressure output of these gage resistors is obtained between electrode pads 13f and 13e by applying a voltage between electrode pads 13a and 13b. With such a construction, since one static pressure diaphragm suffices, the working and wiring are simplified as compared with the embodiment shown in FIGS. 5A to 5C, thereby making it possible to provide a small-size sensor.

Figure 5C:
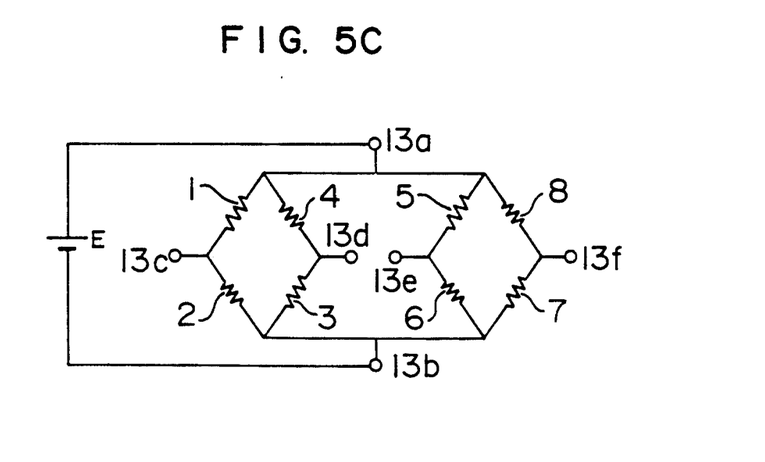

In the foregoing explanation of the integrated multisensor, no explanation (and illustration) has been made of a temperature sensor, as in the embodiment of FIGS. 5A to 5C. However, in the embodiment of FIG. 6 as well as the embodiment of FIGS. 5A to 5C, a gage resistor exclusively used for measuring a change in resistance value caused by a change in temperature is disposed on the semiconductor substrate 10.

Figure 7:
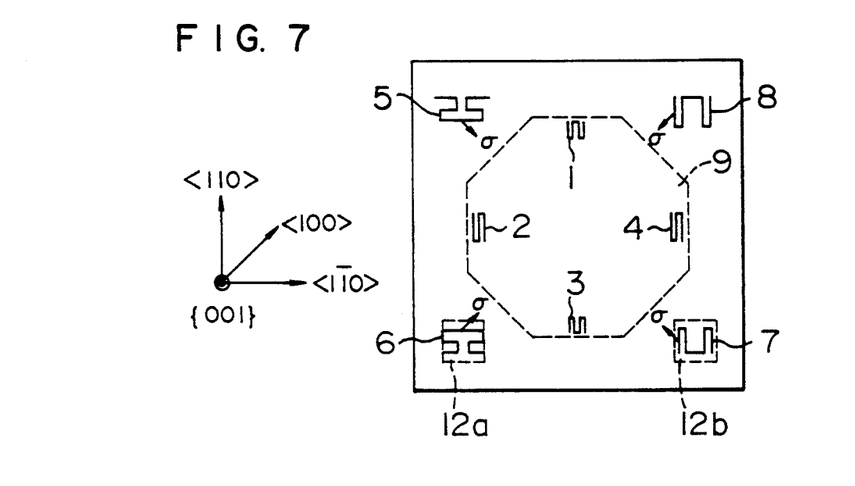
FIG. 7 is a view for explaining a further embodiment of an integrated multisensor according to the present invention.

FIG. 7 shows a further embodiment of an integrated multisensor according to the present invention. In the present embodiment, static pressure detecting gage resistors 5 to 8 are arranged in a direction of <110> relative to a differential pressure detecting diaphragm 9. With such a construction, a stress $\sigma$ based on a differential pressure load acts on the gage resistors 5 to 8 in an oblique direction of 45°. A change in resistance of a gage is given by the following equation:

$$\frac{\Delta R}{R} = \pi_l \sigma_l + \pi_t \sigma_t$$

where $\pi_l$ represents a piezo coefficient in a longitudinal direction, $\pi_t$ a piezo coefficient in a transverse direction, $\sigma_l$ a stress in a longitudinal direction, and $\sigma_t$ a stress in a transverse direction. In the case of the present embodiment in which the gages are arranged in a direction of $<\overline{1}10>$, $$\pi_l = +\frac{1}{2} \pi_{44}, \quad \pi_t = -\frac{1}{2} \pi_{44}$$

($\pi_{44}$: piezoresistance coefficient), $$\sigma_l = \sigma \cos 45° = \frac{1}{\sqrt{2}} \sigma \text{ and } \sigma_t = \sigma \sin 45° = \frac{1}{\sqrt{2}} \sigma.$$

Then, the above equation is reduced to $\Delta R/R = 0$. According to the present embodiment, therefore, the influence of a differential pressure load on a static pressure sensor can be cancelled.

In the case where static pressure detecting diaphragms 12a and 12b are provided in proximity to sides of the differential pressure detecting diaphragm 9, as shown in FIG. 7, an interval d' between the diaphragms 9 and 12 become narrow during etching working since the etching rate in the <100> direction is high like that in a direction of thickness. As a result, the adhesive length decreases so that the strength is deteriorated. Also, thickness variations between chips in a wafer get large depending upon the composition distribution of an etching solution.

Figure 8:
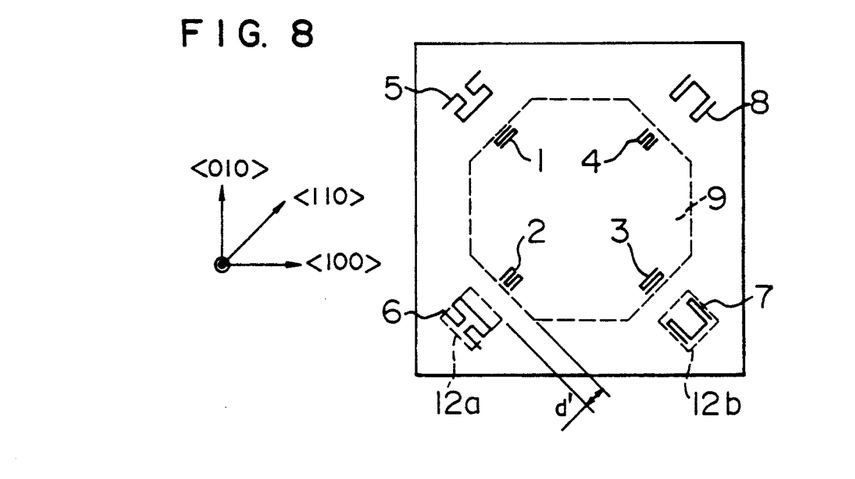
FIG. 8 is a view for explaining a method of manufacturing an integrated multisensor according to the present invention.

Therefore, in the present invention, working as shown in FIG. 8 is made. Namely, static pressure detecting diaphragms 12a and 12b are arranged nearest to <110> oriented sides of a differential pressure detecting diaphragm 9 which is formed by anisotropic etching. With such arrangement, an interval d' between the differential pressure detecting diaphragm 9 and the static pressure detecting diaphragms 12a and 12b can be worked by etching with a high precision. Accordingly, the area of adhesion to the fixing base 11 shown in FIG. 5 can be kept constant, thereby improving the yield.

Figure 9A:
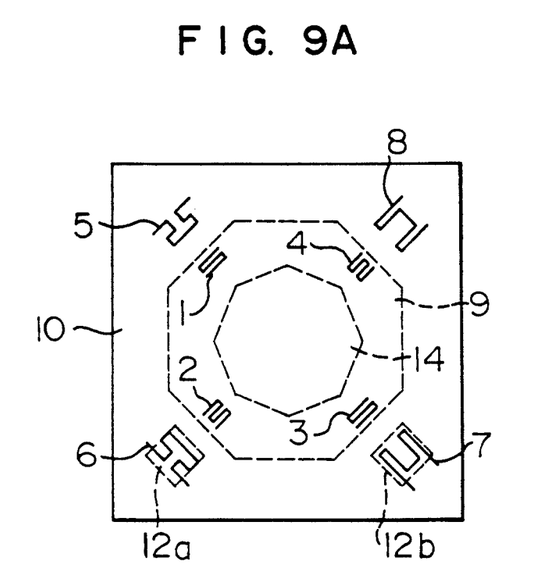
FIGS. 9A and 9B are views showing a still further embodiment of an integrated multisensor according to the present invention.
Figure 9B:
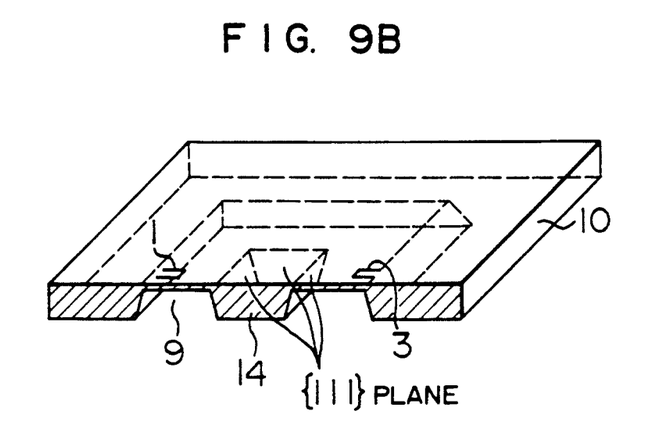

FIG. 9A shows a still further embodiment of an integrated multisensor according to the present invention. In this embodiment, a differential pressure detecting diaphragm 9 is provided with a central rigid plate 14 which has a thickness substantially equal to the thickness of a chip. Further, diaphragms 9, 12a and 12b are made thin by an anisotropic etching process and the central rigid plate 14 is configured into an octagon. In the case where anisotropic etching is made, a quadrangular central rigid plate surrounded by <111> faces as shown in FIG. 9B is most easily formed. However, by virtue of the design of an etching mask, a central plate can be formed with the configuration of a polygon which is angled not less than an octagon in the case of a wafer having a {100} plane and not less than a hexagon in the case of a wafer having a {110} plane. By thus configuring the central rigid body into a polygon angled not less than a hexagon, the concentration of a stress at each corner portion can be reduced in comparison with a quadrangular central rigid plate, thereby improving the pressure durability.

Figure 10A:
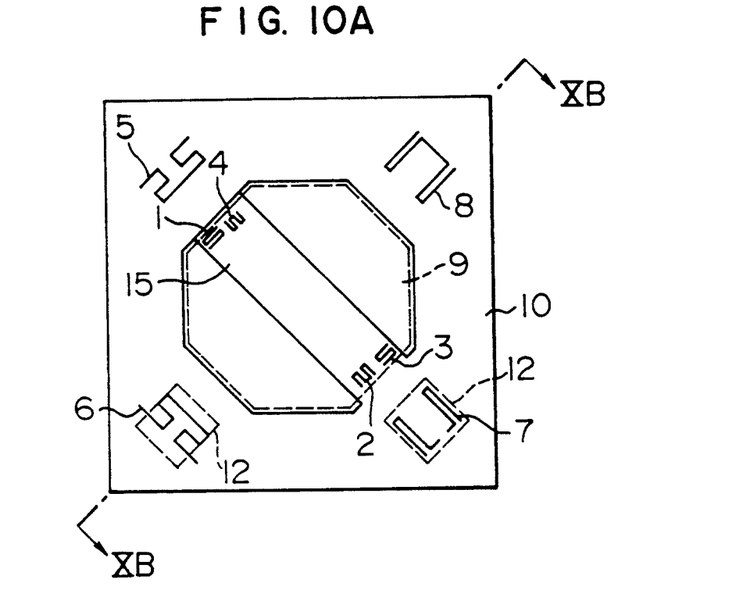
FIGS. 10A and 10B are views showing a furthermore embodiment of an integrated multisensor according to the present invention.
Figure 10B:
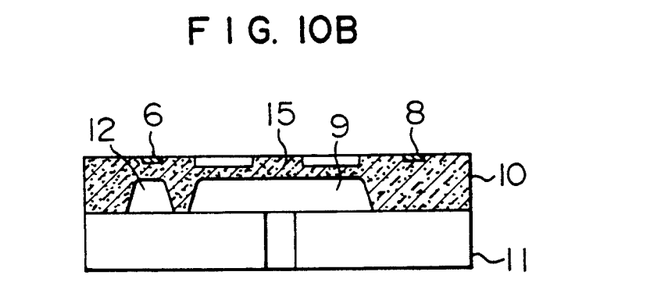

FIG. 10A is a plan view of a furthermore embodiment of an integrated multisensor according to the present invention. FIG. 10B is a cross section taken along line XA—XA in FIG. 10A. In the present embodiment, a differential pressure detecting diaphragm 9 is made thin in such a manner that the diaphragm 9 is etched from its upper surface so as to leave a region (or beam) which joins diffential pressure gages 1, 4 and 2, 3 with each other. The sensitivity of a sensor is substantially determined by (area of diaphragm)/(plate thickness of thinned portion)$^2$. Therefore, if the structure shown in FIGS. 10A and 10B is employed and the sensitivity of the differential pressure sensor increases. Therefore, the diaphragm area becomes small. Further, by using the beam structure, the non-linearity of the differential pressure sensor can be reduced.

If isotropic wet etching is used for the etching from the upper surface, the upper and bottom surfaces can be etched simultaneously, thereby making it possible to shortening a processing time. In addition, corner portions after anisotropic etching are rounded by the isotropic etching, thereby improving the pressure durability.

Figure 11:
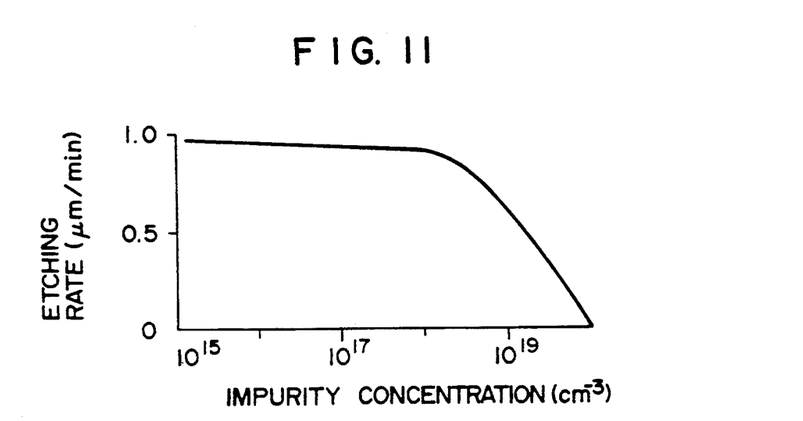
FIG. 11 is a graph showing a relationship between the impurity concentration and the etching rate of a sensor substrate.

FIG. 11 shows a relationship between the impurity such as boron concentration of a substrate and the etching rate in the case where a monocrystalline silicon having a {100} face is anisotropically etched. It is apparent from FIG. 11 that if the impurity concentration is selected to be not higher than $10^{18}/cm^3$, high-speed etching can be achieved, thereby making it possible to shorten a sensor manufacturing time.

Figure 12:
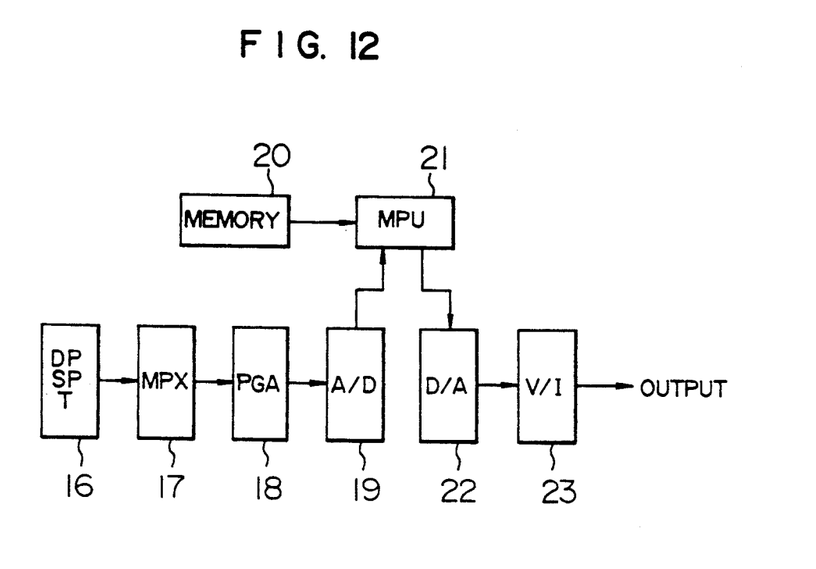
FIG. 12 is a block diagram of a signal processing circuit according to the present invention.

The above-mentioned integrated multisensor is incorporated into the differential pressure transmitter shown in FIG. 2 and a data processing is performed by the signal processing circuit 106 to measure the quantity of flow. The measured quantity of flow is transmitted to the control device 500 shown in FIG. 1. FIG. 12 shows a block diagram of the signal processing circuit 106. An integrated multisensor 16 outputs changes in gage resistance depending upon a differential pressure, a static pressure and a temperature and these outputs are selectively taken in a multiplexer 17 and are amplified by a programable gain amplifier 18. Next, an output of the amplifier 18 is converted by an A/D converter 19 into a digital signal which is in turn sent to a microprocessor 21. The characteristics of differential pressure, static pressure and temperature sensors are preliminarily stored in a memory 20. The microprocessor 21 makes the correction of the sensor outputs by use of those data to detect a differential pressure with a high precision. A D/A converter 22 is converted into an analog signal which is in turn outputted to the control device 500 through a voltage/current converter 23.

Figure 13A:
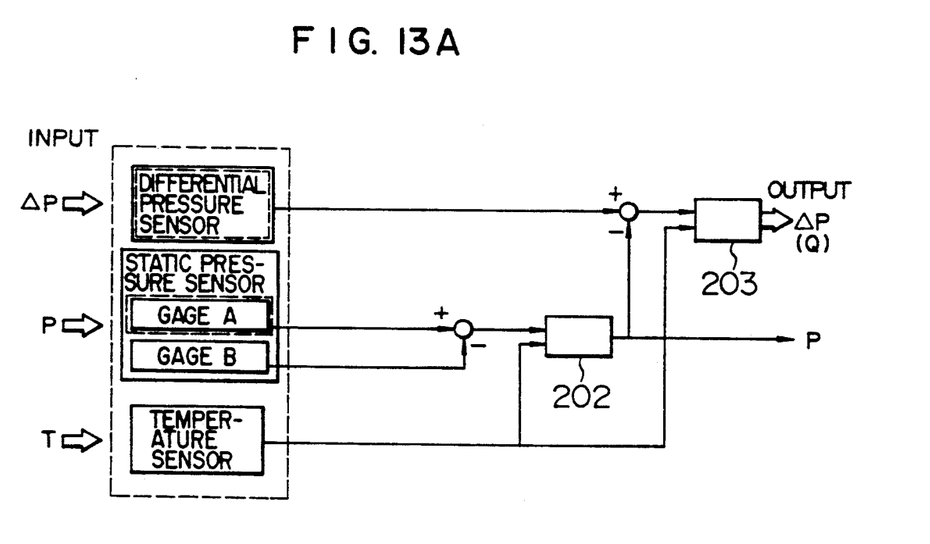
FIGS. 13A and 13B are block diagrams for detection of a differential pressure.
Figure 13B:
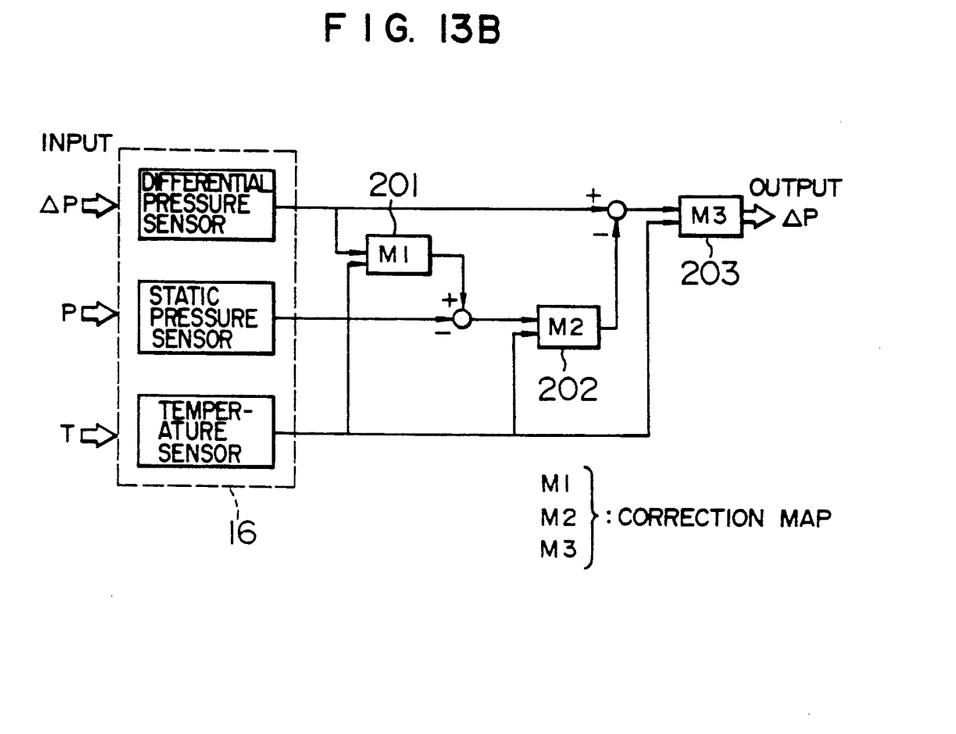
Figure 14:
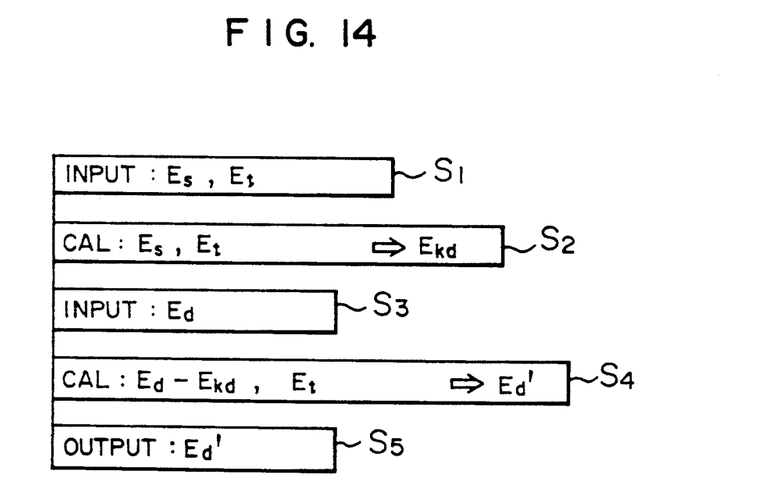
FIG. 14 is a view showing the flow of a data processing.

A characteristic part of the above construction is the memory 20 and the microprocessor 21 which will be mentioned just below. Namely, the characteristics of differential pressure, static pressure and temperature sensors are preliminarily stored as characteristics map into the memory 20. The characteristics map three-dimensionally represents a differential pressure sensor output $E_d$, a static pressure sensor output $E_s$ and a temperature sensor output $E_t$. The microprocessor 21 performs a processing in accordance with a procedure shown in FIG. 13A. Namely, a static pressure is obtained from resistance of static pressure gage formed on the diaphragm and the fixed portion mentioned above. Next an accurate static pressure determined by a block 202 from the output of a static pressure sensor and the output of a temperature sensor by means of the correction map and the output of a differential pressure sensor is corrected by use of the determined static pressure. Next, this corrected differential pressure sensor output is temperature-corrected in a block 203 by means of the characteristics map, thereby obtaining an accurate differential pressure output. In the conventional integrated multisensor, since a static pressure output contains the influence of differential pressure in a greatly added form, it is difficult to make an accurate correction map. Therefore, a complicated processing as shown in FIG. 13B is needed in order to remove the influence of differential pressure (that is, in order to make the correction for the influence of a differential pressure which acts on a static pressure sensor). In the present invention, on the other hand, since only a static pressure can be substantially extracted, a processing is simplified. A pressure transmitter provided in the prior art is not necessary because static signal is outputted exactly in a flow control system of the present invention shown in FIG. 13A. Namely, its function is provided in a differential pressure transmitter. A flow chart of correction is shown in FIG. 14. Firstly, in step $S_1$, the output $E_s$ of a static pressure sensor and the output $E_t$ of a temperature sensor are read. Next, in step $S_2$, the value $E_{kd}$ of influence on the static pressure sensor is determined. Thereafter, in step $S_3$, the output $E_d$ of a differential pressure sensor is read. Next, the influence value $E_{kd}$ determined in step $S_2$ and the temperature sensor output $E_t$ are subtracted from the differential pressure sensor output $E_d$ to determine an accurate differential pressure (steps $S_4$ and $S_5$).

As apparent from the foregoing, the use of a differential pressure transmitter according to the present invention provides effects that an operation processing is simplified, an accurate differential pressure can be detected and a small-size detector for flow detection in a plant system can be provided.

According to the present invention, the influence of a differential pressure appearing on a static pressure sensor can be reduced to approximately zero. Therefore, the correction of characteristics for the influence of the differential pressure becomes unnecessary and the differential pressure can be measured with improved precision. Further, there is an effect that a procedure of correction for static pressure and temperature is simplified and a processing time concerning the measurement of characteristics can be shortened, thereby improving the controlability of the whole of a plant.

Furthermore, if a sensor substrate working method of the present invention is employed, the working can be carried out with a high precision, thereby making it possible to improve the detection precision of a sensor.

We claim:

1. An integrated multisensor comprising a sensor substrate having a plurality of strain-sensitive gage elements formed thereon and a fixing base for supporting said sensor substrate thereon, in which at least one static pressure detecting diaphragm is provided separately from a differential pressure detecting diaphragm formed in said sensor substrate and static pressure detecting means including at least one first static pressure sensor having a strain-sensitive gage element formed on said static pressure detecting diaphragm and at least one second static pressure sensor having a strain-sensitive gage element formed on a fixed portion of said sensor substrate other than on said static pressure detecting diaphragm and said differential pressure detecting diaphragm of said sensor substrate, and processing means for processing output signals of said at least one first static pressure sensor and said at least one second static pressure sensor so as to obtain a static pressure signal independent of a differential pressure.

2. An integrated multisensor according to claim 1, wherein a temperature detecting sensor including a strain-insensitive gage is provided on the fixed portion of said sensor substrate separately from said static pressure detecting means.

3. An integrated multisensor according to claim 2, wherein the strain-sensitive gage element formed on said fixed portion is disposed nearer to a center of said differential pressure detecting diaphragm than the strain-sensitive gage element formed on said static pressure detecting diaphragm.

4. An integrated multisensor according to claim 2, wherein the strain-sensitive gage element formed on said static pressure detecting diaphragm and the strain-sensitive gage element formed on said fixed portion are disposed at positions where a stress generated due to a differential pressure is equally exerted.

5. An integrated multisensor according to claim 2, wherein an etching depth of said differential pressure detecting diaphragm from its surface opposite to its strain-sensitive gage element forming surface is substantially the same as an etching depth of said static pressure detecting diaphragm.

6. An integrated multisensor according to claim 2, wherein said sensor substrate is made of monocrystalline silicon and said strain-sensitive gage elements include piezoresistance elements which are different from said sensor substrate.

7. An integrated multisensor according to claim 2, wherein said differential pressure detecting diaphragm on said sensor substrate is configured into a polygon which is angled not less than a hexagon.

8. An integrated multisensor according to claim 2, wherein in forming said static and differential pressure detecting diaphragms by anisotropically etching a monocrystalline silicon wafer having a {100} plane, said static pressure detecting diaphragm is provided in proximity to a <110> oriented side of said differential pressure detecting diaphragm.

9. An integrated multisensor according to claim 2, wherein in forming said static and differential pressure detecting diaphragms by anisotropically etching a monocrystalline silicon wafer having a {100} plane, said static pressure detecting diaphragm is disposed in a direction of <100> from a center line of said differential pressure detecting diaphragm.

10. An integrated multisensor according to claim 2, wherein said integrator multisensor is disposed in an output portion of a differential transmitter and detected values of differential pressure, static pressure and temperature are outputted respectively.

11. An integrated multisensor according to claim 10, further comprising a plant system having an intelligent transmitter including said differential transmitter and said integrated multisensor therein, and means for processing outputs provided by said intelligent transmitter.

12. An integrated multisensor comprising a sensor substrate having a plurality of strain-sensitive gage elements formed thereon and a fixing base for supporting said sensor substrate thereon, in which at least one static pressure detecting diaphragm is provided separately from a differential pressure detecting diaphragm formed in said sensor substrate and static pressure detecting means is formed by a strain-sensitive gage element formed on said static pressure detecting diaphragm and a strain-sensitive gage element formed on a fixed portion of said sensor substrate other than on said static pressure detecting diaphragm and on said differential pressure detecting diaphragm of said sensor substrate, a temperature detecting sensor including a strain-insensitive gage is provided on the fixed portion of said sensor substrate separately from said static pressure detecting means, and an integrated multisensor wherein there is provided signal processing means for processing output signals of a strain-sensitive gage element formed on said differential pressure detecting diaphragm, the strain-sensitive gage element formed on said static pressure detecting diaphragm provided separately from said differential pressure detecting diaphragm, the strain-sensitive gage element formed on said fixed portion and the temperature detecting strain-insensitive gage element, and a differential pressure, a static pressure and a temperature are individually detected.

13. A static pressure detecting method in an integrated multisensor including a differential pressure sensor, a static pressure sensor and a temperature sensor provided on a sensor substrate, comprising the steps of obtaining output signals at least one first strain-sensitive gage element formed on a static pressure detecting diaphragm provided separately from a differential pressure detecting diaphragm and at least one second strain-sensitive gage element formed on a fixed portion of said sensor substrate other than said differential pressure detecting diaphragm and on said static pressure detecting diaphragm of said sensor substrate, and processing said output signals of said at least one first strain-sensitive gage element and said at least one second strain-sensitive gage element so as to obtain a static pressure signal independent of a differential pressure.

14. A static pressure detecting method according to claim 13, further comprising a step of obtaining an output signal of the temperature sensor and the step of processing includes utilizing the output signal of the temperature sensor to correct the static pressure signal.

15. A static pressure detecting method according to claim 14, wherein a differential pressure signal is obtained by an output from said differential pressure sensor, and further comprising the step of correcting the output of the differential pressure sensor in accordance with the corrected static pressure signal.

16. An intelligent transmitter comprising sensing means including gage element for detecting a differential pressure, a static pressure and a temperature, pressure receiving means for protecting said sensing means and data processing means for performing a processing of an operation on an output signal of said sensing means, in which said sensing means comprises differential pressure detecting means including a differential pressure detecting strain-sensitive gage element formed on a differential pressure detecting diaphragm provided in a sensor substrate, static pressure detecting means including a strain-sensitive gage element formed on a static pressure detecting diaphragm provided separately from said differential pressure detecting diaphragm and a strain-sensitive gage element formed on a fixed portion of said sensor substrate other than on said differential pressure detecting diaphragm and as said static pressure detecting diaphragm of said sensor substrate, and temperature detecting means including a strain-sensitive gage element formed on said fixed portion.

17. An intelligent transmitter according to claim 16, wherein said data processing means corrects and output of said static pressure detecting means for influence thereon exerted by a change in temperature by use of an output of said temperature detecting means and corrects an output of said differential pressure detecting means for influence thereon exerted by a change in static pressure by use of the corrected static pressure value.

18. An intelligent transmitter according to claim 17, wherein said data processing means includes a memory in which a relation of static pressure or differential pressure with a change in temperature is recorded as three-dimensional map data and a microprocessor which processes a detection value of said sensing means on the basis of the data stored in said memory.

19. A method of manufacturing an integrated multisensor including forming static and differential pressure detecting diaphragms by anisotropically etching a monocrystalline silicon waver having a (100) plane, and disposing said static pressure detecting diaphragm in proximity to a <100> oriented side of said differential pressure detecting diaphragm so that a direction and center position of said static pressure detecting diaphragm is different from a direction and center position of said different pressure detecting diaphragm and an influence of a differential pressure acting on a static pressure sensor incorporating said static pressure detecting diaphragm is reduced.

20. A method according to claim 19, wherein said static pressure detecting diaphragm is worked by etching so that it is disposed on a diagonal line of a sensor substrate.

21. A method according to claim 19, wherein said monocrystalline silicon wafer has an impurity concentration not higher than $2 \times 10^{18}/cm^3$.

22. A plant system comprising an intelligent transmitter for measuring the quantity of static pressure and flow from opposite ends of an orifice provided in a pipeline and a control device for producing a command signal to an actuator such as a pump on the basis of the result of measurement by said intelligent transmitter and a command from an input/output device so that the quantity of flow takes a predetermined value, in which said intelligent transmitter comprises a sensing part including na differential pressure sensor composed of a strain-sensitive gage element formed on a differential pressure detecting diaphragm provided in a sensor substrate, a static sensor composed of a strain-sensitive gage element formed on a static pressure detecting diaphragm provided separately from said differential pressure detecting diaphragm and a strain-sensitive gage element formed on a fixed portion of said sensor substrate other than on said differential pressure detecting diaphragm and on said static pressure detecting diaphragm of said sensor substrate, and a temperature sensor composed of a strain-insensitive gage element formed on said fixed portion, and a signal processing part including means for making the correction for a change of said differential pressure sensor depending upon static pressure and temperature.

* * * * *